United States Patent
Vetter

(10) Patent No.: US 9,522,485 B2
(45) Date of Patent: Dec. 20, 2016

(54) PRIMARY MATERIAL FOR MOLDS ADAPTED TO MOLD PLASTICS

(71) Applicant: BUDERUS EDELSTAHL GMBH, Wetzlar (DE)

(72) Inventor: Peter Vetter, Weilmuenster (DE)

(73) Assignee: BUDERUS EDELSTAHL GMBH, Wetzlar (DE)

( * ) Notice: Subject to any disclaimer, the term of this patent is extended or adjusted under 35 U.S.C. 154(b) by 757 days.

(21) Appl. No.: 13/853,607

(22) Filed: Mar. 29, 2013

(65) Prior Publication Data

US 2013/0255844 A1 Oct. 3, 2013

(30) Foreign Application Priority Data

Mar. 30, 2012 (DE) .................. 20 2012 003 298 U

(51) Int. Cl.
| | | |
|---|---|---|
| C22C 38/00 | (2006.01) | |
| B29C 33/38 | (2006.01) | |
| C22C 38/02 | (2006.01) | |
| C22C 38/04 | (2006.01) | |
| C22C 38/06 | (2006.01) | |
| C22C 38/44 | (2006.01) | |
| C21D 9/00 | (2006.01) | |
| C21D 1/18 | (2006.01) | |

(52) U.S. Cl.
CPC ............... *B29C 33/38* (2013.01); *C21D 1/18* (2013.01); *C21D 9/0068* (2013.01); *C22C 38/001* (2013.01); *C22C 38/02* (2013.01); *C22C 38/04* (2013.01); *C22C 38/06* (2013.01); *C22C 38/44* (2013.01); *Y02P 10/212* (2015.11)

(58) Field of Classification Search
CPC ........ C22C 38/001; C22C 38/02; C22C 38/04; C22C 38/06; C22C 38/44; B29C 33/38; C21D 9/0068; C21D 1/18
See application file for complete search history.

(56) References Cited

U.S. PATENT DOCUMENTS

| 5,645,794 A | 7/1997 | Beguinot | |
|---|---|---|---|
| 2003/0131911 A1 | 7/2003 | Grimm et al. | |
| 2008/0073006 A1* | 3/2008 | Henn | ............... B29C 45/37 148/654 |

FOREIGN PATENT DOCUMENTS

| CA | 2 161 740 | 6/2005 |
|---|---|---|
| EP | 1 251 187 | 7/2003 |

* cited by examiner

*Primary Examiner* — Veronica F Faison
(74) *Attorney, Agent, or Firm* — Greenblum & Bernstein, P.L.C.

(57) ABSTRACT

A mold material having a material hardness higher than 340 HB and a fine-grain structure. The mold material having a composition in weight percent that includes:
C=0.25-0.35
Si=0.04-0.20
Mn=1.00-2.00
Cr=1.00-2.00
Ni=0.30-less than 0.90
Mo=0.30-0.80
V=less than/equal to 0.20
Al=0.01-0.03
N=0.0025-0.0150
S=less than 0.15
a remainder of Fe and impurities.

20 Claims, No Drawings

PRIMARY MATERIAL FOR MOLDS ADAPTED TO MOLD PLASTICS

CROSS-REFERENCE TO RELATED APPLICATIONS

The present application claims priority under 35 U.S.C. §119 of German Patent Application No. 202012003298.4, filed Mar. 30, 2012, the disclosure of which is expressly incorporated by reference herein in its entirety.

BACKGROUND OF THE INVENTION

1. Field of the Invention

The invention relates to a primary material utilized in making a metal mold used to mold a plastic. In embodiments, the mold is made of a high hardness material.

2. Discussion of Background information

Molds or matrices for producing or molding plastic parts require particular a homogenous material quality, especially over its cross section. Such molds will have essentially unchanging high quality characteristics during their entire service time or a planned number of parts or pieces produced thereby.

The most important properties that a primary material or a mold formed thereof can have relate to, on the one hand, a homogenous distribution of high material hardness, which resists abrasion, wear and permanent shape changes (especially in the work surface region), and, on the other hand, identical microstructures and a high degree of purity in the material. This latter feature is of specific concern during the machining of work surfaces, as well as polishing and/or chemical structuring of the same.

It is known from EP 1 251 187 B1, to utilize a tool steel for making molds used to mold plastic parts which have a composition that utilizes the following in weight of:
C=0.25-0.30
Si=0.04-0.20
Mn=1.20-2.00
Cr=1.00-2.00
Ni=0.90-1.50
Mo=0.30-0.80
V≤0.20
Al=0.01-0.03.

This material was created to form molds with high core hardness and a large diameter.

An Ni content of 0.90-1.50 percent by weight imparts to the material a continuous hardness which meets certain requirements during a tempering of the material, and without costly technical alloying measures, such as, for example, alloying with boron as well as aluminum and titanium—which is necessary to increase the hardness penetration depth.

However, a disadvantage relates to the fact that material hardness mainly above a value of 31 HRC (approximately 298 HB) cannot, or not with economic security, be achieved with high cost.

SUMMARY OF THE INVENTION

The invention builds upon the tool steel disclosed EP 1 251 187 B1, and goes beyond the same by creating a primary material for a mold which in the tempered state has an increased material hardness and material homogeneity with only a slight reduction of the through-hardening ability.

The primary material or mold made of the same can particularly have, in the tempered state, a material hardness higher than 340 HB, and utilizing a composition, in weight percent, the following:
C=0.25-0.35
Si=0.04-0.20
Mn=1.00-2.00
Cr=1.00-2.00
Ni=0.30-less than 0.90
Mo=0.30-0.80
V=less than/equal to 0.20
Al=0.01-0.03
N=0.0025-0.0150
S=less than 0.15
Fe and manufacturing-specific impurities as the remainder.

An advantage achieved by the invention is essentially that, in comparison with the material disclosed EP 1 251 187 B1, there is an increase in the carbon content—made possible through a reduction of the nickel content at a given cooling rate, without strengthening the retained austenite formation. This leads to a higher hardness acceptance and allows for a material hardness of higher than 340 HB (higher than 36 HRC) at sufficiently high annealing temperatures.

In order to achieve a particularly homogenous finegrained microstructure of the mold steel according to the invention, a nitrogen concentration of 25 to 150 ppm is, and has been found, set for an aluminum content of 0.01 to 0.03 percent by weight. A content of less than 0.0025 percent by weight is ineffective because of the given Cr and Mn content for fine-granularity. On the other hand, a content greater than 0.015 percent by weight can result in inhomogeneity and coarse nitride precipitations over the cross section of the mold.

In a beneficial embodiment of the invention, a material hardness of higher than 355 to 412 HB can be provided by utilizing technical alloying measures and also by utilizing corresponding tempering technology or techniques.

According to the invention, high material hardness values can be achieved with only slightly reduced through-tempering properties of the mold for carbon contents of over 0.30 to 0.34 percent by weight and/or nickel concentrations of 0.38 to 0.90 percent by weight of the mold material after hardening and annealing.

The quality or use properties, in particular with respect to the tempering structure and to the hardness (such as over the diameter of the primary material or of the mold), can be further improved if a value D lies between 2.20 and 3.50, and the value D is composed of (Mn weight percent)+2×(Ni weight percent).

A reduced molybdenum content of the steel, namely between 0.40 and 0.70 percent by weight, can boost the homogeneity of the cast ingot and can reduce the carbon liquation in the mold manufactured therefrom.

Utilizing a vanadic content of 0.015 to 0.18 percent by weight in the material can boost its annealing consistency.

An advantageous effect of utilizing nitrogen on a homogenization of the crystalline structure (in large molds) can be achieved within a content range of N=0.005 to 0.01 percent by weight.

If no particularly distinctively favorable machinability of the tempered material is required, then it can, in particular for chemical stresses and for high buffability of the working surface, be advantageous if a sulfur content is limited at 0.01 percent by weight.

Other exemplary embodiments and advantages of the present invention may be ascertained by reviewing the present disclosure and the accompanying drawing.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

EXAMPLES

In an exemplary embodiment, there is provided a primary material adapted for use in a mold for molding plastics, wherein the material comprising, in a tempered state, a composition having a material hardness of higher than 340 HB and the composition including in weight percent:
C=0.25-0.35
Si=0.04-0.20
Mn=1.00-2.00
Cr=1.00-2.00
Ni=0.30-less than 0.90
Mo=0.30-0.80
V=less than/equal to 0.20
Al=0.01-0.03
N=0.0025-0.0150
S=less than 0.15
a remainder of Fe and impurities.

In an exemplary embodiment, the material hardness is between 355 HB and 410 HB.

In an exemplary embodiment, C is between 0.30 and 0.34 weight percent.

In an exemplary embodiment, Ni is between 0.38 and 0.90 weight percent.

In an exemplary embodiment, the composition satisfies the formula D=Mn+2Ni and has a value between 2.20 and 3.50.

In an exemplary embodiment, Mo is between 0.40 and 0.70 weight percent.

In an exemplary embodiment, V is between 0.015 and 0.18 weight percent.

In an exemplary embodiment, N is between 0.005 and 0.01 weight percent.

In an exemplary embodiment, S is than 0.01 weight percent.

In an exemplary embodiment, the impurities are manufacturing-specific impurities.

In an exemplary embodiment, there is provided a mold material adapted for molding plastics, the material comprising, in a tempered state, a composition having a material hardness of higher than 340 HB and the composition including in weight percent:
C=0.25-0.35
Si=0.04-0.20
Mn=1.00-2.00
Cr=1.00-2.00
Ni=0.30-less than 0.90
Mo=0.30-0.80
V=less than/equal to 0.20
Al=0.01-0.03
N=0.0025-0.0150
S=less than 0.15
a remainder of Fe and impurities.

In an exemplary embodiment, the material hardness is between 355 HB and 410 HB.

In an exemplary embodiment, C is between 0.30 and 0.34 weight percent.

In an exemplary embodiment, Ni is between 0.38 and 0.90 weight percent.

In an exemplary embodiment, the composition satisfies the formula D=Mn+2Ni and has a value between 2.20 and 3.50.

In an exemplary embodiment, Mo is between 0.40 and 0.70 weight percent.

In an exemplary embodiment, V is between 0.015 and 0.18 weight percent.

In an exemplary embodiment, N is between 0.005 and 0.01 weight percent.

In an exemplary embodiment, S is than 0.01 weight percent.

In an exemplary embodiment, there is provided a method making a mold adapted for molding plastics, wherein the method comprises forming a material comprising, in a tempered state, a material hardness of higher than 340 HB and a composition including in weight percent:
C=0.25-0.35
Si=0.04-0.20
Mn=1.00-2.00
Cr=1.00-2.00
Ni=0.30-less than 0.90
Mo=0.30-0.80
V=less than/equal to 0.20
Al=0.01-0.03
N=0.0025-0.0150
S=less than 0.15
a remainder of Fe and impurities.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A primary material adapted for use in a mold for molding plastics, the material comprising, in a tempered state, a composition having a material hardness of higher than 340 HB and the composition consisting essentially of, in weight percent:
C=0.25 to 0.35
Si=0.04 to 0.20
Mn=1.00 to 2.00
Cr=1.00 to 2.00
Ni=0.30 to less than 0.90
Mo=0.30 to 0.80
V=less than/equal to 0.20
Al=0.01 to 0.03
N=0.0025 to 0.0150

S=less than 0.15 a remainder of Fe and impurities.

2. The primary material of claim 1, wherein the material hardness is between 355 HB and 410 HB.

3. The primary material of claim 1, wherein C is between 0.30 and 0.34 weight percent.

4. The primary material of claim 1, wherein Ni is between 0.38 and 0.90 weight percent.

5. The primary material of claim 1, wherein the composition satisfies the formula D=Mn+2Ni and has a value between 2.20 and 3.50.

6. The primary material of claim 1, wherein Mo is between 0.40 and 0.70 weight percent.

7. The primary material of claim 1, wherein V is between 0.015 and 0.18 weight percent.

8. The primary material of claim 1, wherein N is between 0.005 and 0.01 weight percent.

9. The primary material of claim 1, wherein S is than 0.01 weight percent.

10. The primary material of claim 1, wherein the impurities are manufacturing-specific impurities.

11. A mold material adapted for molding plastics, the material comprising, in a tempered state, a composition having a material hardness of between 355 HB and 410 HB and the composition includes, in weight percent:

C=0.25 to 0.35
Si=0.04 to 0.20
Mn=1.00 to 2.00
Cr=1.00 to 2.00
Ni=0.30 to less than 0.90
Mo=0.30 to 0.80
V=less than/equal to 0.20
Al=0.01 to 0.03
N=0.0025 to 0.0150
S=less than 0.15
a remainder of Fe and impurities.

12. The material of claim 11, wherein C is between 0.30 and 0.34 weight percent.

13. The material of claim 11, wherein Ni is between 0.38 and 0.90 weight percent.

14. The material of claim 11, wherein the composition satisfies the formula D=Mn+2Ni and has a value between 2.20 and 3.50.

15. The material of claim 11, wherein Mo is between 0.40 and 0.70 weight percent.

16. The material of claim 11, wherein V is between 0.015 and 0.18 weight percent.

17. The material of claim 11, wherein N is between 0.005 and 0.01 weight percent.

18. The material of claim 11, wherein S is than 0.01 weight percent.

19. A method making a mold adapted for molding plastics, the method comprising forming a material comprising, in a tempered state, a material hardness of between 355 HB and 410 HB and a composition including consisting essentially of, in weight percent:

C=0.25 to 0.35
Si=0.04 to 0.20
Mn=1.00 to 2.00
Cr=1.00 to 2.00
Ni=0.30 to less than 0.90
Mo=0.30 to 0.80
V=less than/equal to 0.20
Al=0.01 to 0.03
N=0.0025 to 0.0150
S=less than 0.15
a remainder of Fe and impurities.

20. A primary material adapted for use in a mold for molding plastics, the material comprising, in a tempered state, a material hardness of between 355 HB and 410 HB and a composition consisting essentially of, in weight percent:

C=0.25 to 0.35
Si=0.04 to 0.20
Mn=1.00 to 2.00
Cr=1.00 to 2.00
Ni=0.30 to less than 0.90
Mo=0.30 to 0.80
V=less than/equal to 0.20
Al=0.01 to 0.03
N=0.0025 to 0.0150
S=less than 0.15
a remainder of Fe and impurities.

* * * * *